Figure 1:
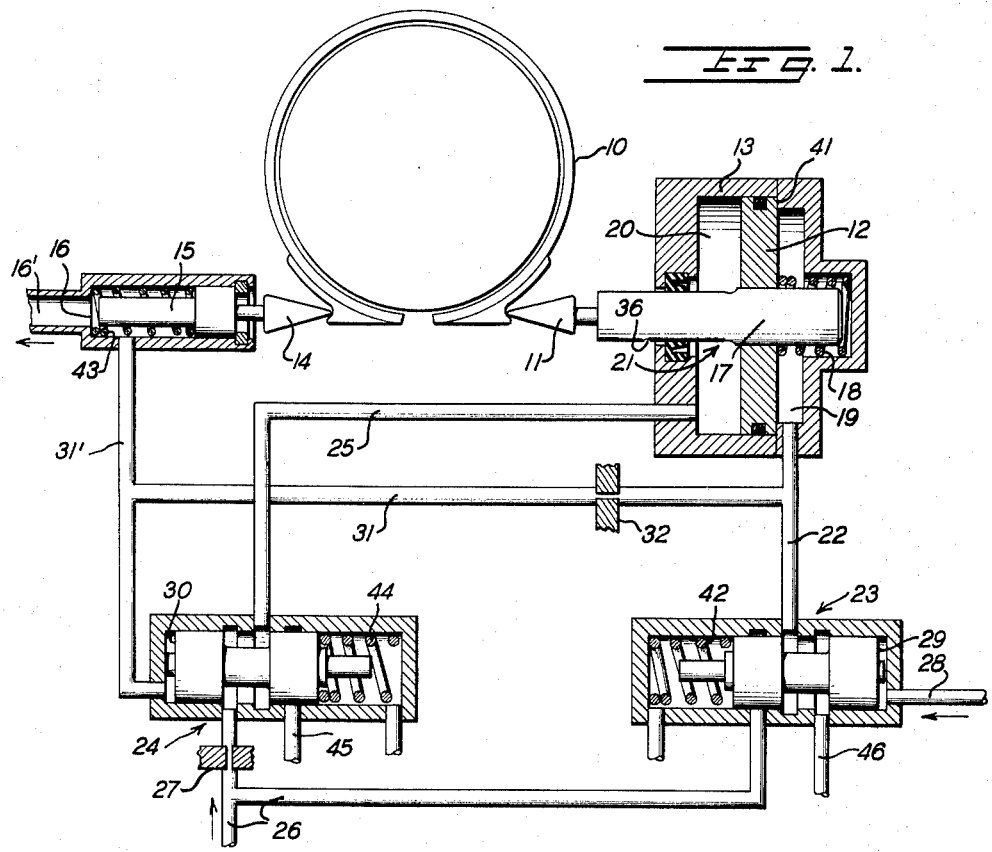

May 17, 1966  HANS-JOACHIM M. FOERSTER ETAL  3,251,246
CONTROL ARRANGEMENT FOR SHIFTING DEVICES
OF CHANGE-SPEED TRANSMISSIONS
Filed June 30, 1958   3 Sheets-Sheet 1

INVENTORS.
HANS-JOACHIM M. FOERSTER
ULRICH ELTZE
BY Dicke and Craig
ATTORNEYS

May 17, 1966   HANS-JOACHIM M. FOERSTER ETAL   3,251,246
CONTROL ARRANGEMENT FOR SHIFTING DEVICES
OF CHANGE-SPEED TRANSMISSIONS
Filed June 30, 1958                                        3 Sheets-Sheet 2

INVENTORS.
HANS-JOACHIM M. FOERSTER
ULRICH ELTZE
BY Dick and Craig
ATTORNEYS

May 17, 1966   HANS-JOACHIM M. FOERSTER ETAL   3,251,246
CONTROL ARRANGEMENT FOR SHIFTING DEVICES
OF CHANGE-SPEED TRANSMISSIONS
Filed June 30, 1958                              3 Sheets-Sheet 3

INVENTORS.
HANS-JOACHIM M. FOERSTER
ULRICH ELTZE

BY   Dicke & Craig
                    ATTORNEY

United States Patent Office
3,251,246
Patented May 17, 1966

3,251,246
CONTROL ARRANGEMENT FOR SHIFTING DEVICES OF CHANGE-SPEED TRANSMISSIONS
Hans-Joachim M. Foerster, Stuttgart-Bad Cannstatt, and Ulrich Eltze, Stuttgart-Riedenberg, Germany, assignors to Daimler-Benz Aktiengesellschaft, Stuttgart-Unterturkheim, Germany
Filed June 30, 1958, Ser. No. 746,063
Claims priority, application Germany, July 26, 1957, D 26,074
26 Claims. (Cl. 74—751)

The present invention relates to an arrangement for effectively shifting change-speed transmissions, i.e., engaging the different transmission ratios thereof, adapted to be shifted or engaged by force-locking devices, especially to planetary gear transmissions shifted by means of auxiliary forces whereby the shifting members, for example, brakes, are adapted to be shifted by special control members in dependence on the reversal of torque from a condition corresponding to freewheeling to full engagement thereof, as also more fully described in the copending application Serial No. 697,217, entitled "Control Arrangement for Force-Locking Devices" filed November 18, 1957 and assigned to the assignee of the present application. Consequently, those parts of this copending application, which may be necessary or pertinent, are incorporated herein by reference.

The aforementioned copending application describes in detail a shifting arrangement of the type briefly described hereinabove. With the use of a brake as a shifting or engaging member, the construction proposed in the copending application was such that at first a slight initial engaging pressure of, for example, 0.5 atmospheric excess pressures was adjusted to be applied to the actuating piston of the brake band which thereupon was automatically increased to the full pressure upon reversal of torque at the brake band.

The present invention aims at an improvement of the arrangement of the aforementioned copending application, especially with respect to the speed of shifting thereof and to the production, reliable in operation, of the initial abutment or engaging force. The problems arising therefrom are solved in accordance with the present invention in that with a brake serving as shifting member, the actuating or engaging piston thereof is constructed as a double-acting piston which is acted on hydraulically on both sides thereof over appropriate control members and to which a spring, possibly an adjustable spring, is coordinated for purposes of producing the initial engaging or abutment pressure for the freewheeling-like engagement thereof.

Especially for purposes of increasing the shifting speed, one embodiment according to the present invention provides that both sides of the double-acting actuating piston are connected with each other by means of a short-circuiting valve which is arranged in a connecting line between the pressure spaces on both sides of the piston. In connection therewith, it may be particularly appropriate if the short-circuiting valve is arranged in the hollow piston rod of the actuating piston and if the piston is provided on the piston front side thereof with a central aperture and on the piston rear side with one or several radial apertures.

The construction according to the present invention provides, first of all, a very simple and operationally reliable adjustment and control of the initial engaging pressure for the brake band by means of the spring. The use of a short-circuiting valve permits that upon application of the full brake pressure the oil quantity on both sides of the actuating piston is only exchanged and does not need to be conducted thereto at that time from an oil reservoir or the like which results in an increased shifting speed.

The arrangement in accordance with the present invention is made in such a manner that with a disengaged brake the full pressure is effective on the rear side of the actuating piston and thereby retains the piston in the end position thereof against the spring. The spring for the abutment or engagement of the brake band becomes effective only if the full pressure has been built up also on the front side of the piston so that the two pressures on both sides of the piston essentially equalize or cancel one another. Only when the pressure on the rear side of the piston is decreased or reduced, then the full brake pressure becomes available for the brake band.

For that purpose, the pressure on the front side of the actuating piston is controlled by a slide valve member which may be actuated or engaged either manually or automatically from the transmission control arrangement, for example, by hydraulic means. The pressure on the rear side of the piston is thereby controlled by a further slide valve member in dependence on the reversal of torque in such a manner that with a disengaged brake the full pressure is effective on the rear side of the piston.

Both control valve members may be in communication with each other by a common pressure supply means and also by the further fact that the pressure supply line for the front side of the actauting piston is connected by means of a line with the pressure space for the control valve member of the piston rear side and simultaneously also with the elastic abutment member for the other brake band end which in turn is constructed as a discharge valve.

Accordingly, it is an object of the present invention to provide a control arrangement for the actuation of a shifting member of a change-speed transmission which assures reliable operation at all times and which enables relatively high-engaging speeds for the different transmission ratios of the transmission.

Another object of the present invention is the provision of a control arrangement for the actuating apparatus of a change-speed transmission which is simple in construction and which may be readily adjusted for the proper, desired operation thereof.

Still another object of the present invention is the provision of a control arrangement for the shifting device of a change-speed transmission which prevents the interruption of transmission of the drive upon reversal of the direction of flow of the torque yet permits a freewheeling like operation thereof under certain operating conditions.

A further object of the present invention is the provision of a control arrangement for force-locking shifting devices of change-speed transmissions in which a double-acting piston member is used to provide a predetermined initial engagement of the shifting member in such a manner as to produce a free-wheeling-like engagement thereof and which is automatically operative to fully engage the shifting member in a relatively very short period of time.

Figure 2:
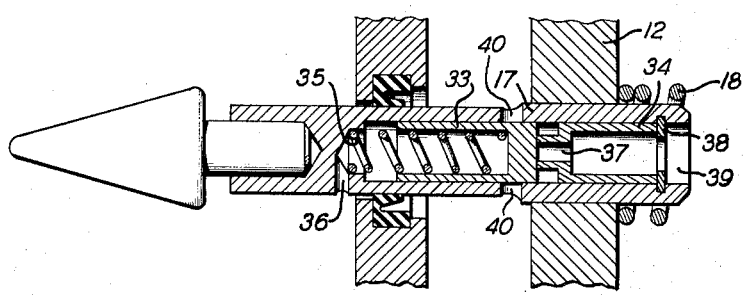
Figure 3:
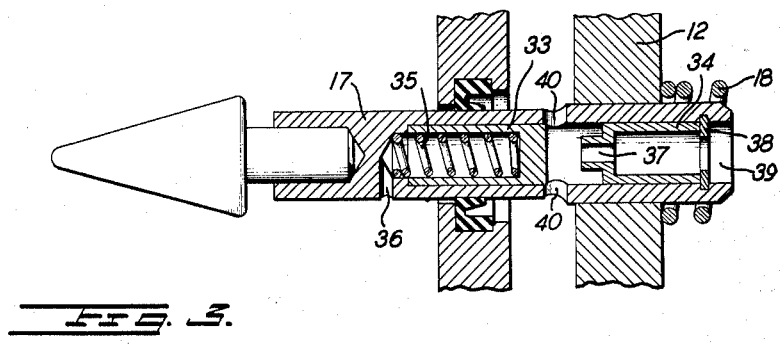
Figure 4:
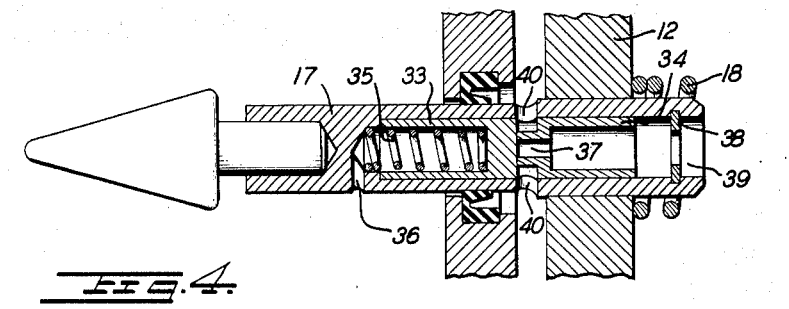
Figure 5:
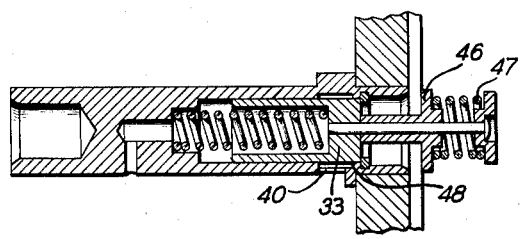
Figure 6:
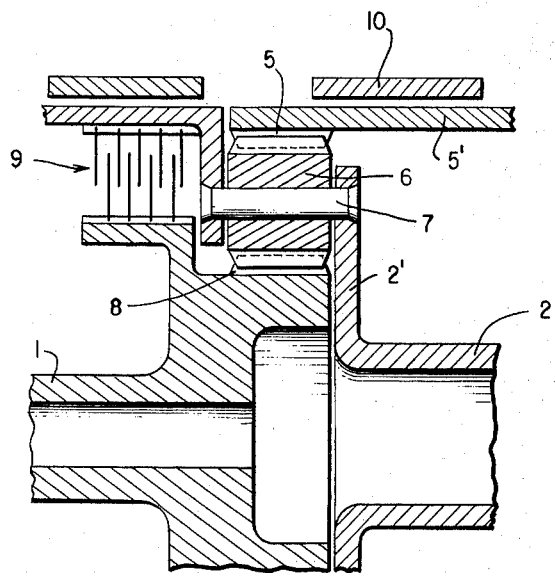

These and other objects, features and advantages of the present invention will become more obvious from the following description when taken in connection with the accompanying drawing which shows, for purposes of illustration only, two embodiments in accordance with the present invention, and wherein:

FIGURE 1 is a schematic view, with certain parts thereof shown in cross section, of a control arrangement for a shifting device of a change-speed transmission in accordance with the present invention, FIGURES 2 through 4 are cross-sectional views through one of the plunger or actuating members provided with a short-circuiting valve in accordance with the present invention and showing the same in different operating positions thereof, FIGURE 5 is a cross-sectional view through a modified embodiment of the short-circuiting valve in accordance with the present invention, and FIGURE 6 is a partial cross-sectional view through a planetary gear with which the present invention may be used.

Referring now to the drawing, wherein like reference numerals are used throughout the various views to designate like parts, reference numeral 10 designates the brake band which, as already proposed in the aforementioned copending application, is actuated by means of a plunger member 11 from a piston 12 arranged in a hydraulic pressure cylinder 13. The other end of the brake band 10 is elastically supported by means of a further plunger member 14. This elastic support of the plunger member 14 is spring-loaded by spring 43 and is constructed as a discharge valve whereby the piston 15 controls the valve cross-section 16 of a discharge line 16'.

A double-acting piston 12 which is operative as actuating piston is secured onto a piston rod 17 in any suitable manner. A compression spring 18 is arranged on the front side of the piston 12 which serves for purposes of producing the slight initial abutment or engaging pressure for the initial engagement of the brake band 10. The cylinder space 19 located on the front side of the piston 12 is in communication with the cylinder space 20 located on the rear side of the piston 12 by means of a line in which a short-circuiting valve generally designated by reference numeral 21 is arranged. The connection between cylinder spaces 19 and 20 may take place appropriately through the piston rod 17 itself so that the short-circuiting valve is arranged within the piston rod 17 as will be described more fully hereinafter. However, it is also possible to accommodate the short-circuiting valve 21 within the piston 12 itself or also outside the same in the cylinder wall or possibly also anywhere else outside the same.

The pressure of the pressure medium in the cylinder space 19 on the front side of the piston 12 is adapted to be built up through a supply line section 22 by means of a control valve member generally designated by reference numeral 23. A further control valve member generally designated by reference numeral 24 controls over supply line section 25 the pressure of the hydraulic medium in the cylinder space 20 on the rear side of the piston 12. Both control valve members 23 and 24 are supplied with a pressure medium over a supply line 26 whereby a throttling device 27 of any suitable construction which may possibly be also of the adjustable type such as a throttling valve may be connected into the line section of supply line 26 ahead of and leading to the control valve member 24.

The actuation of the control valve member 23 may take place either manually or automatically by means of the transmission control arrangement, for example, in that pressure is permitted to build up under certain conditions, controlled and determined by the transmission control arrangement, over a control line 28 in front of the piston surface 29 of the control valve member 23. The control valve member 24, in contrast thereto, is actuated in dependence on the reversal of torque at the brake band 10. For that purpose, the piston surface 30 of the control valve member 24 is acted on at the front side of the piston thereof over a line 31 by the working pressure of the pressure medium. The line 31 is in communication for that purpose with supply line section 22 leading from control valve member 23 to the cylinder space 19 located on the front side of the piston 12 whereby a throttling device 32, possibly of the adjustable type is inserted into line 32. Furthermore, the line 31 is in communication over line section 31' with the elastic abutment for the other end of the brake band 10 which abutment is constructed as a discharge valve 16.

As shown in FIGURE 2, the short-circuiting valve 21 arranged within the piston rod 17 is formed of two parts and consists of a disconnecting piston 33 and a check-valve piston 34 which are arranged coaxially to each other in such a manner that the former is arranged essentially within the region on the piston rear side of piston 12 while the latter is arranged essentially within the region on the front side of piston 12. The disconnecting piston 33 is constructed in a pot-like manner open at the rear end thereof and is provided within the interior thereof with a spring 35. A bore 36 provided in the piston rod 17 relieves the rear side of the disconnecting piston 33 toward the outside or atmosphere. The check valve piston 34 is provided with a central bore or aperture 37 on the rear side thereof. The stroke of both piston members 33 and 34 is limited by a split ring 38 or any other suitable device. A central aperture 39 is provided in the piston rod 17 on the piston front side and two or more oppositely disposed radial apertures 40 are provided in the piston rod on the piston rear side thereof.

FIGURE 6 illustrates a conventional planetary gear operable to provide different transmission ratios between shafts 1 and 2 which may be the input and output shaft of the planetary gear though it is also understood that shaft 2 may be the input shaft and shaft 1 the output shaft. A sun gear 8, for example, formed integral with the shaft 1 meshes with at least one planet gear 6 adapted to rotate on the planet carrier 7. The planet gear 6 in turn is adapted to mesh with the ring gear 5 connected to or formed integral with a drum portion 5'. The brake 10 is adapted to engage with the drum portion 5' to hold the ring gear 5 stationary. The planet carrier 7 is connected by way of flange portion 2' with the shaft 2 while a lock-up clutch generally designated by reference numeral 9 is operable to lock up the planetary gear in the conventional manner by connecting the planet carrier 7 with the sun gear 8.

*Operation*

The operation of the control arrangement in accordance with the present invention is as follows:

In the position of the different parts shown in FIGURES 1 and 2, the brake 10 is disengaged. The short-circuit valve 21 is thereby closed since disconnecting piston member 33 closes off radial bores 40. Pressure has been built up in the cylinder space 20 on the rear side of the piston 12 over lines 26 and 25. As a result of the existence of pressure in the cylinder space 20, the piston 12 is forced into the right end position thereof as shown in FIGURE 1 whereby it abuts against the internal shoulder 41 provided within cylinder 13. No pressure exists in the cylinder space 19 on the front side of the piston 12 since the control valve member 23 blocks the supply line 26.

If now the piston surface 29 is loaded or subjected to pressure over control line 28 so that the control valve member 23 is thereby moved toward the left against the force of spring 42, then the pressure in the cylinder space 19 on the front side of the piston 12 begins to build up over supply line section 22. Simultaneously therewith, this pressure, i.e., the pressure prevailing in line 22, is correspondingly reduced in line 31 by reason of the throttling device 32, and the pressure medium continues to flow off into atmosphere or other suitable discharge places, i.e., is discharged into the discharge portion of the system, as long as the discharge valve 16 remains open at the abutment member of the other end of the brake band 10.

The pressures at both piston sides of the actuating piston 12 cancel one another so that the spring 18 is now able to move the piston 12 toward the left as seen in FIGURE 1 and therewith is able to engage the brake band 10 against the brake drum with a slight initial pretension corresponding to the freewheeling-like engagement thereof. As shown in FIGURE 3, the pressure in the cylinder space 19 simultaneously therewith has forced the disconnecting piston 33 into the left end position thereof against the spring force of spring 35 since the pressure in cylinder space 19 is effective on the front side of piston member 33 over central aperture 39, the inside of check valve piston member 34 and central bore 37 thereof so that a connection between the cylinder spaces 19 and 20 on both sides of the piston 12 is established with the piston members 33 and 34 in the position thereof shown in FIGURE 3 over the hollow piston rod 17, i.e., central aperture 39, central bore 37, and cross bores 40. The oil flows out of the cylinder space 20 on the piston rear side into the cylinder space 19 on the piston front side to the extent of the path traversed by the piston 12 with the same pressure on both sides of the piston 12.

As soon now as the direction of rotation changes at the brake drum, i.e., a reversal of torque takes place in the transmission, the reaction force at the elastic abutment member increases in a jump-like manner and thereby overcomes the force of spring 43. As a result thereof, the discharge valve 16 is rapidly closed and the full pressure may now build up also in line 31. The full pressure in line 31 thereby becomes effective on the piston surface 30 of the control valve member 24 and forces the latter against the spring 44 toward the right as seen in FIGURE 1. With such movement toward the right of the control valve member 24, the supply line section 25 is connected with the discharge 45 and the cylinder space 20, i.e., the rear side of the actuating piston 12 is relieved of pressure so that now the full pressure of the pressure medium is effective only in the cylinder space 19, i.e., on the front side of the piston 12. The piston 12 thereby moves completely toward the left, whereby the oil flows off from the rear side to the front side of the piston 12 over short-circuiting valve 21 in the manner described hereinabove. The full pressure by the pressure medium on the front side of the piston 12 forces the check valve piston 34 into the left end position thereof, as shown in FIGURE 4, due to the particular construction and dimensions of piston member 34, and thereby closes the radial bores 40. The connection between both piston sides of piston 12 over the short-circuiting valve 21 is thereby again interrupted.

The disengagement of the brake band 10 takes place as the pressure in control line 28 disappears. This may take place under circumstances determined, for example, in the control shifting mechanism for the change-speed transmission. As soon as the pressure disappears in control line 28, the spring 42 moves the control valve member 23 into the right end position thereof and the cylinder space 19 on the front side of piston 12 is relieved through the discharge 46 as the control valve member 23 moves to the right. Simultaneously therewith, the line 31 also becomes pressureless so that the control valve member 24 may return toward the left end position thereof due to the presence of and force exerted by spring 44. As a result of the leftward movement of the control valve member 24, the pressure is again built up in the cylinder space 20 on the piston rear side and the brake is thereby again completely disengaged. The throttling device 27 thereby has the purpose to throttle the pressure during the disengaging operation of the brake to such an extent that the disconnecting piston 33 of the short-circuiting valve is moved with certainty into the closing position thereof as shown in FIGURE 2, in which radial bores 40 are closed off to thereby assure proper operation during the next engaging cycle.

According to FIGURE 5, the short-circuiting valve again consists of a disconnecting piston 33 to which is coordinated a plate valve 46 which is also operative as return or check valve. A weak spring 47 is added to or operatively connected with the plate 46 which, however, may also be provided with the check valve piston members 34 of the construction according to FIGURES 1 to 4 if so desired. However, it is important in connection therewith that the disconnecting piston 33 releases the control edge 48 of the aperture 40 already before the check valve member 46 closes. As to the rest, the operation of the short-circuiting valve of FIGURE 5 is the same as that described in connection with FIGURE 1.

The term "free-wheeling" is used herein to describe the operational effect produced by the engaging installation or shifting arrangement in accordance with the present invention in which the brake drum is permitted to rotate relative to the brake band 10 in one direction of rotation regardless of the condition of the control and actuating members of the engaging installation whereas rotation of the brake drum in the opposite direction thereof is effectively prevented upon engagement of the brake, as described fully hereinabove, so that upon engagement of the brake, in accordance with the present invention, a free-wheeling effect is obtained that is analogous to the free-wheeling effect of a disengageable one-way free-wheeling device.

While we have shown and described two embodiments in accordance with the present invention, it is understood that the same is not limited thereto but is susceptible of many changes and modifications within the scope and spirit of the present invention, and we therefore intend to cover all such changes and modifications as are encompassed by the scope of the appended claims.

We claim:

1. A shifting arrangement for effectively shifting a change-speed transmission having a plurality of transmission ratios and an engaging member adapted to effectively and selectively establish one of said transmission ratios or provide a freewheeling-like condition in said transmission, comprising shifting means operatively connected with said engaging member for selectively initially producing said freewheeling-like condition or for fully engaging at least one of said transmission ratios including double-acting actuating means adapted to be acted on hydraulically on both sides thereof by a pressure medium and spring means operatively connected with said double-acting actuating means for producing the initial freewheeling-like condition, auxiliary force means providing a pressure medium for actuating said actuating means, and control means including said auxiliary force means for controlling automatically full engagement of said shifting means from the initial free-wheeling-like condition established by said spring means, by said pressure medium in response to a reversal of torque in said transmission.

2. A shifting arrangement for effectively shifting a change-speed transmission having a plurality of transmission ratios and an engaging member adapted to effectively and selectively establish one of said transmission ratios or provide a free-wheeling-like condition in said transmission, comprising shifting means operatively connected with said engaging member for selectively initially producing said free-wheeling-like condition or for fully engaging at least one of said transmission ratios including double-acting actuating means adapted to be acted on hydraulically on both sides thereof by a pressure medium, auxiliary force means providing a pressure medium for actuating said actuating means, and control means including said auxiliary force means for controlling automatically full engagement of said shifting means by said pressure medium in response to a reversal of torque in said transmission, said shifting means including two cylinder spaces separated from one another by said double-acting actuating means, and a line with short-circuiting valve means for connecting said two cylinder spaces with each other.

3. A shifting arrangement according to claim 2, wherein said double-acting actuating means is a double-acting piston having a piston rod provided within the region of the piston front side with a central aperture and within the region of the piston rear side with at least one radial bore, and wherein said short-circuiting valve means is disposed within said piston rod and cooperates with said aperture and bore.

4. A shifting arrangement according to claim 3, wherein said short-circuiting valve means is made of two parts consisting of a pot-shaped disconnecting piston member and of a check-valve piston member arranged coaxially to said disconnecting piston member.

5. A shifting arrangement according to claim 4, wherein said check-valve piston member is provided with a central bore on the rear side thereof.

6. A shifting arrangement according to claim 5, further comprising a weak spring for spring-loading said check valve piston member.

7. A shifting arrangement according to claim 4, wherein said check-valve piston member is constructed as plate valve member.

8. A shifting arrangement according to claim 7, further comprising a weak spring for spring-loading said plate valve member.

9. A shifting arrangement according to claim 4, wherein said pot-shaped disconnecting piston member includes a spring arranged on the inside thereof, and bore means in said piston rod for relieving the space within said disconnecting piston member accommodating said spring.

10. A shifting arrangement for effectively shifting a change-speed transmission having a plurality of transmission ratios and an engaging member adapted to effectively and selectively establish a free-wheeling-like condition in said transmission or establish one of said transmission ratios, comprising shifting means operatively connected with said engaging member for selectively initially producing said free-wheeling-like condition or for fully engaging at least one of said transmission ratios including double-acting actuating means adapted to be acted on hydraulically on both sides thereof by a pressure medium, auxiliary force means providing a pressure medium for actuating said actuating means, control means including said auxiliary force means for controlling automatically full engagement of said shifting means by said pressure means in response to a reversal of torque in said transmission, and spring means operatively connected with said double-acting actuating means to produce an initial engaging pressure of said shifting means for the free-wheeling-like actuation thereof.

11. A shifting arrangement according to claim 10, wherein said double-acting actuating means is an actuating piston with a piston front side and a piston rear side, and wherein said control means includes a control valve member for controlling the pressure on said piston front side.

12. A shifting arrangement according to claim 11, wherein said control valve member is manually controlled.

13. A shifting arrangement according to claim 11, wherein said control valve member is automatically controlled by the shifting arrangement for said change-speed transmission.

14. A shifting arrangement according to claim 11, wherein said control means includes a further control valve member operative in response to reversal of torque in said transmission for so controlling the pressure on said piston rear side that with a disengaged engaging member the full pressure thereof is effective.

15. A shifting arrangement according to claim 14, wherein said control means includes a line connecting said first-mentioned control valve member with said piston front side, and a further line connecting said first-mentioned line with the piston surface of said further control valve member.

16. A shifting arrangement according to claim 15, further comprising adjustable throttling means in said further line.

17. A shifting arrangement according to claim 16, wherein said engaging member is a brake having a brake band and one plunger member each cooperating with a respective end of said brake band, one of said plunger members being operatively connected with said double-acting actuating means and the other plunger member constituting an elastic abutment.

18. A shifting arrangement according to claim 17, wherein said elastic abutment is in the form of a discharge valve, and a line section interconnecting said further line with said discharge valve.

19. A shifting arrangement according to claim 18, further comprising throttling means in the supply line to said further control valve member.

20. A shifting arrangement according to claim 19, wherein said shifting means includes two cylinder spaces separated from one another by said double-acting actuating means, and a line with short-circuiting valve means for connecting said two cylinder spaces with each other.

21. A shifting arrangement according to claim 20, wherein said double-acting actuating means is a double-acting piston having a piston rod provided within the region of the piston front side with a central aperture and within the region of the piston rear side with at least one radial bore, and wherein said short-circuiting valve means is disposed within said piston rod and cooperates with said bore and aperture.

22. A shifting arrangement according to claim 21, wherein said short-circuiting valve means is made of two parts consisting of a pot-shaped disconnecting piston member and of a check-valve piston member arranged coaxially to said disconnecting piston member.

23. A shifting arrangement for effectively engaging the different speeds of a change-speed transmission having a plurality of transmission ratios and a rotatable part adapted to be braked by means of a brake operative to effectively and selectively establish a free-wheeling-like condition or a full engagement of one of said transmission ratios, comprising engaging means operatively connected with said brake for selectively producing said free-wheeling condition or for fully engaging at least one of said transmission ratios including a double-acting piston, auxiliary force means providing a pressure medium for actuating said engaging means acting on both sides of said piston, and control means including said auxiliary force means and two control valve members for controlling the pressure on a respective one of the two sides of said piston to thereby control full engagement of said shifting means in response to a reversal of the direction of rotation of said rotatable part, and spring means operatively connected with said piston to produce an initial engaging pressure for said brake for the free-wheeling-like actuation thereof.

24. A shifting arrangement according to claim 23, wherein said spring is adjustable.

25. A shifting arrangement according to claim 24, wherein said shifting piston includes a two-partite short-circuiting valve means for establishing a communication between the cylinder spaces on both sides of said double-acting piston.

26. A shifting arrangement for effectively engaging different speeds of a change-speed transmission having a plurality of transmission ratios and a rotatable part adapted to be braked by brake means operative to effectively and selectively establish a free-wheeling-like condition or full engagement of one of the transmission ratios, comprising engaging means operatively connected with said brake means for selectively producing said free-wheeling-like condition or for fully engaging at least one of said transmission ratios including actuating means and spring means operatively connected with said actuating means and normally urging said actuating means into a position producing said free-wheeling-like condition, auxiliary force means providing a pressure medium for actuating said engaging means, and control means including said auxiliary force means and valve means for controlling the pressure on respective sides of said actuating means to thereby control full engagement of said engaging means from said free-wheeling-like condition in response to a reversal of the direction of rotation of said rotatable part.

References Cited by the Examiner

UNITED STATES PATENTS 2,645,137  7/1953  Roche _____ 74—754 X
2,818,708  1/1958  Kelley _____ 74—732 X DAVID J. WILLIAMOWSKY, *Primary Examiner.*

SAMUEL SPINTMAN, BROUGHTON G. DURHAM, DON A. WAITE, *Examiners.*

J. D. COFFELT, T. C. PERRY, *Assistant Examiners.*